(12) United States Patent
Sakata

(10) Patent No.: US 10,734,667 B2
(45) Date of Patent: Aug. 4, 2020

(54) NEGATIVE ELECTRODE ELECTROLYTE SOLUTION AND FLOW BATTERY

(71) Applicant: KABUSHIKI KAISHA TOYOTA CHUO KENKYUSHO, Nagakute-shi, Aichi-ken (JP)

(72) Inventor: Jiro Sakata, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 129 days.

(21) Appl. No.: 15/900,500

(22) Filed: Feb. 20, 2018

(65) Prior Publication Data

US 2018/0261871 A1   Sep. 13, 2018

(30) Foreign Application Priority Data

Mar. 10, 2017 (JP) .................................. 2017-045723

(51) Int. Cl.
  *H01M 4/86*   (2006.01)
  *H01M 4/90*   (2006.01)
  *H01M 8/18*   (2006.01)

(52) U.S. Cl.
  CPC ......... *H01M 8/188* (2013.01); *H01M 4/8663* (2013.01); *H01M 4/90* (2013.01); *H01M 2300/0005* (2013.01); *Y02E 60/528* (2013.01)

(58) Field of Classification Search
  CPC ...... H01M 4/8663; H01M 4/90; H01M 8/188; H01M 2300/0005; Y02E 60/528
  See application file for complete search history.

(56) References Cited

U.S. PATENT DOCUMENTS

| 4,362,791 | A | 12/1982 | Kaneko et al. |
| 2010/0307974 | A1* | 12/2010 | Pettinger ................... A61L 9/01 210/650 |
| 2012/0135278 | A1* | 5/2012 | Yoshie .................. H01M 8/188 429/7 |
| 2014/0030572 | A1 | 1/2014 | Esswein et al. |
| 2014/0080035 | A1 | 3/2014 | Esswein |
| 2014/0138576 | A1 | 5/2014 | Esswein |
| 2016/0149251 | A1 | 5/2016 | Reece |
| 2017/0256811 | A1 | 9/2017 | Humbarger |

FOREIGN PATENT DOCUMENTS

| JP | H57-009072 A | 1/1982 |
| JP | 2015-529941 A | 10/2015 |
| JP | 2015-529942 A | 10/2015 |
| JP | 2016-85955 A | 5/2016 |

OTHER PUBLICATIONS

Sigma-Aldrich Pyrocatechol, 2020 (Year: 2020).*
English-language translation of May 14, 2019 Office Action issued in Japanese Patent Application No. 2017-045723.

* cited by examiner

*Primary Examiner* — Anca Eoff
(74) *Attorney, Agent, or Firm* — Oliff PLC

(57) ABSTRACT

A negative electrode electrolyte solution which contains titanium ions, a chelating agent, and a catechol-based compound having a catechol structure is used for a negative electrode of a flow battery in which an electrolyte solution is circulated so as to perform charge and discharge.

11 Claims, 7 Drawing Sheets

NEGATIVE ELECTRODE ELECTROLYTE SOLUTION AND FLOW BATTERY

This is application claims the benefit of JP 2017-045723, filed Mar. 10, 2017. The disclosure of the prior application is hereby incorporated by reference herein in its entirety.

BACKGROUND OF THE INVENTION

1. Field of the Invention

The present disclosure of an invention disclosed in the present specification relates to a negative electrode electrolyte solution and a flow battery.

2. Description of the Related Art

In the related art, flow batteries in which a complex of a titanium ion and catechol or the like is used for a flow battery active material have been proposed (refer to, for example, PTLs 1 and 2). These flow batteries are determined to be usable flow batteries on the basis of a cyclic voltammetry (CV) evaluation in a strong alkaline pH range. Also, a flow battery in which an EDTA chelate of Ti is used for a negative electrode electrolyte solution of the flow battery has been proposed (refer to, for example, PTL 3). Regarding this flow battery, it is disclosed that a redox battery having a large electromotive force can be produced by shifting a standard electrode potential to the negative side. In addition, a flow battery in which a mediator that performs oxidation and reduction is used has been proposed (refer to, for example, PTL 4). In this flow battery, the charge and discharge capacity can be increased by using a polyoxometalate as a mediator so as to perform indirect oxidation and reduction of a solid active material.

CITATION LIST

Patent Literature

PTL 1: Japanese Unexamined Patent Application Publication (Translation of PCT Application) No. 2015-529941
PTL 2: Japanese Unexamined Patent Application Publication (Translation of PCT Application) No. 2015-529942
PTL 3: Japanese Unexamined Patent Application Publication No. 57-9072
PTL 4: Japanese Unexamined Patent Application Publication No. 2016-85955

SUMMARY OF THE INVENTION

Titanium ions have a standard electrode potential of −0.368 V and is as low as −0.57 V with reference to a Ag/AgCl electrode potential. In addition, titanium ions are inexpensive and, therefore, are a promising water-soluble material for forming a flow battery negative electrode. However, titanium ions are stable in only a strong acidic range where hydrogen is easily generated by reduction, and use as a negative electrode active material is difficult. Further, if the pH is increased to the value of a weak acid or higher in order to prevent generation of hydrogen, there is a problem in that titanium ions are precipitated. PTLs 1 and 2 describe active materials having a complex structure of a Ti ion and catechol or the like, carboxylic acid, or both, but according to the evaluation examples under a condition of pH≥9, the oxidation-reduction potentials were −0.4 V or less with reference to a reversible hydrogen electrode (RHE) and −1.1 V or less with reference to a Ag/AgCl electrode. Although, Ti(salicylate)$_3$ functions in a weak alkaline range of pH=8.6, the concentration in the solution is 0.5 M, which is significantly lower than the concentration of other solutions, and therefore, there is a problem in that the concentration cannot be increased. In addition, the oxidation-reduction potential is −0.96 V with reference to a Ag/AgCl electrode and is significantly lower than the oxidation-reduction potential of a solid active material. Meanwhile, the oxidation-reduction potentials of various Ti lactates in neutral and acidic ranges are shown, and there are problems in that fluctuation occurs to a great extent due to the pH and in that the oxidation-reduction peak potential difference is as much as 1 V so as to exhibit polarization to a great extent. Regarding Ti citrate, only a single result, that is, a result of pH=5, is described, and the behavior in the neutral range is not indicated. PTLs 1 and 2 disclose that stabilization of the Ti ion is ensured up to the strong alkaline range by a reaction with a compound having an o-dihydroxybenzene structure (catechol structure) in the molecule. However, excessive stabilization occurs, the oxidation-reduction potential of the Ti complex is reduced to −1.1 V or less (with reference to a Ag/AgCl electrode), and hydrogen generation cannot be prevented up to the weak alkaline range. Further, the oxidation-reduction potential (with reference to a Ag/AgCl electrode) of the citrate is −0.54 V, but there is a problem in that precipitation occurs in a neutral range or an alkaline range. Meanwhile, PTL 3 discloses an example in which an EDTA chelate of Ti is used for a negative electrode electrolyte solution of a flow battery, and stable operation is ensured only in an acidic range of pH=4. Meanwhile, in a flow battery of PTL 4, a polyoxometalate (POM) is used as a mediator. However, further improvements are desired because, for example, the molecular weight is as much as several thousand, and it is difficult to increase the molar concentration of the mediator. On the other hand, a Ti compound that is stably present from a weak acidic range to a weak alkaline range, in which a solid negative electrode active material, e.g., lithium titanate phosphate (LTP) or sodium titanate phosphate (NTP), functions stably, and that performs oxidation-reduction at about −0.7 to −0.8 V, which is an oxidation-reduction potential of the solid active material, is not known.

The present disclosure has been made in consideration of such problems, and the main object is to provide a negative electrode electrolyte solution which contains titanium ions and which can be used in a wide pH range and to provide a flow battery.

In order to achieve the above-described object, the present inventors performed intensive research. As a result, it was found that a negative electrode active material solution (anolyte), which can be stably used in a wide pH range, was produced by using titanium ions, a chelating agent, and a compound having a catechol structure in combination. Consequently, the invention disclosed in the present specification was realized.

That is, a negative electrode electrolyte solution disclosed in the present specification is used for a negative electrode of a flow battery in which an electrolyte solution is circulated so as to perform charge and discharge and the negative electrode electrolyte solution contains titanium ions, a chelating agent, and a catechol-based compound having a catechol structure.

A flow battery disclosed in the present specification includes a liquid delivery portion that enables the above-described negative electrode electrolyte solution to flow and to come into contact with a negative electrode collector.

The present disclosure provides a negative electrode electrolyte solution that contains titanium ions and can be used in a wide pH range and provides a flow battery. It is conjectured that such an effect is obtained because of the following. For example, in order to stabilize the titanium ions, utilization of a titanium chelate is considered. However, a titanium chelate composed of a common chelating agent having a carboxyl group has low stability and low solubility in a neutral range. Meanwhile, a titanium compound of a catechol-based compound having a catechol structure (o-dihydroxybenzene structure) stably dissolves even in a strong alkaline range. However, the oxidation-reduction potential is −1.2 V or less (with reference to a Ag/AgCl electrode), which is excessively low, and as a result, hydrogen generation cannot be prevented in the neutral range. The reason for this may be excessively high stability. On the other hand, it was found that, when a chelating agent, a catechol-based compound, and titanium ions were made to be present in combination, precipitation did not occur even in a weak alkaline range, the oxidation-reduction potential did not become excessively low, and oxidation-reduction of the titanium ions could be performed without generating hydrogen. This is considered to be because both the chelating agent and the catechol-based compound were coordinated with the titanium ions. In this regard, it is conjectured that the resulting complex exhibits multiple oxidation-reduction potentials which encompass the oxidation-reduction potential of a solid active material because the complex can have a plurality of coordination states and, thereby, functions favorably as a flow battery mediator in combination with the solid active material. Consequently, the flow battery negative electrode electrolyte solution that can operate over the weak acidic range, the neutral range, and the weak alkaline range, as described above, can address a corrosion problem and a safety problem when leakage occurs. In addition, when the negative electrode electrolyte solution serving as a mediator is present in combination with the solid active material and is used for the flow battery, the capacity can be increased and operation from the weak acidic range to the weak alkaline range can be performed, with such operation being necessary to prevent deactivation of the solid active material. Further, a mediator that functions at multiple oxidation-reduction potentials, which are close to the solid active material oxidation-reduction potential required for performing charge and discharge of the solid active material or which encompass the solid active material oxidation-reduction potential, is provided, and a high-capacity flow battery exhibiting small polarization can be realized.

DETAILED DESCRIPTION OF THE INVENTION

Figure 1:
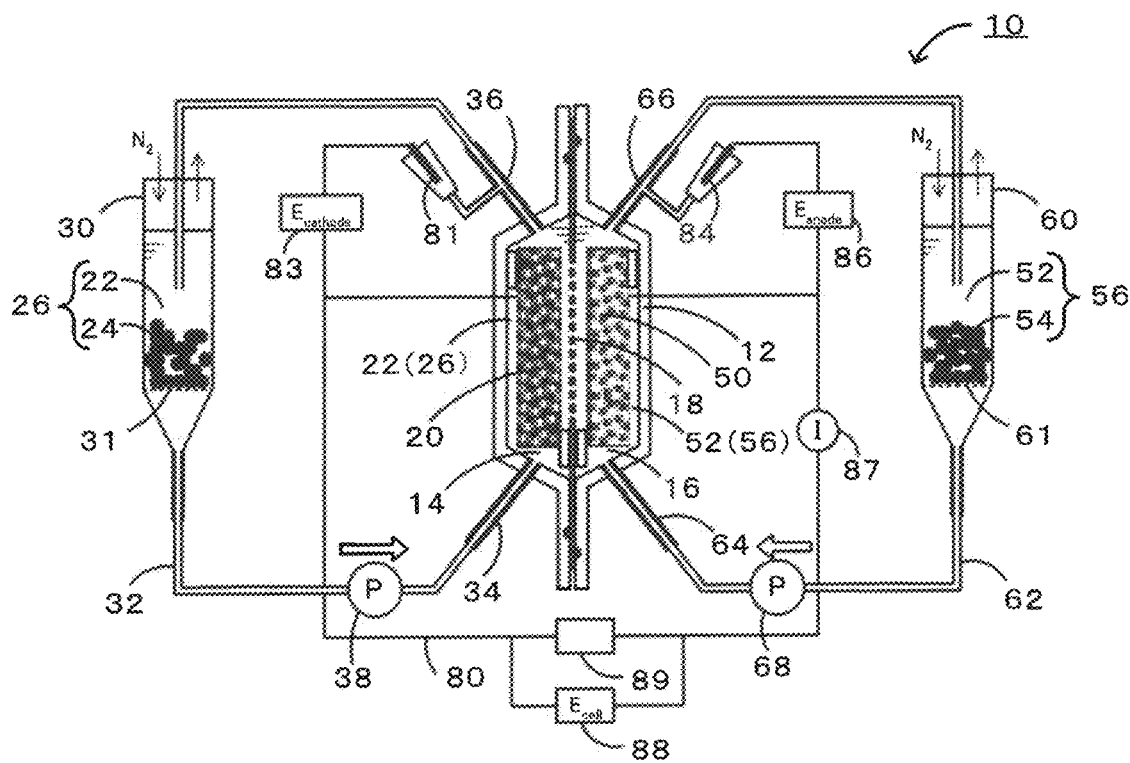
FIG. 1 is an explanatory diagram schematically showing the configuration of a flow battery 10.

The negative electrode electrolyte solution according to the present disclosure is used for a negative electrode of a flow battery in which an electrolyte solution is circulated so as to perform charge and discharge. The negative electrode electrolyte solution contains titanium ions, a chelating agent, and a catechol-based compound having a catechol structure. The solvent of the electrolyte solution is preferably water. The titanium ions are obtained from, for example, a sulfate, a nitrate, or a chloride, and, in particular, titanium sulfate is preferable. In the negative electrode electrolyte solution, the titanium ion content is preferably within the range of 0.01 mol/L or more and 2 mol/L or less, and more preferably within the range of 0.1 mol/L or more and 1 mol/L or less.

The chelating agent included in the negative electrode electrolyte solution is preferably a compound having at least three carboxy groups in the molecule. Also, it is preferable that the chelating agent have a diamine structure. This is because dissolution into a solvent may be performed with ease, and a complex with the titanium ion is easily formed. For example, the chelating agent is preferably a compound having a diamine structure that includes a carbon chain which may have a substituent and which has a carbon number of 2 or more and 5 or less and carboxy groups bonding to the nitrogen of the diamine structure. Examples of substituents include a hydroxy group, a carboxy group, and a hydrophilic group, e.g., a sulfo group. The chelating agent may contain at least one of ethylenediaminetetraacetic acid (EDTA, formula 1), 1,3-diamino-2-hydroxypropanetetraacetic acid (DPTA, formula 2), or derivatives thereof. Examples of derivatives of ethylenediaminetetraacetic acid include EDTAOH in which one carboxy group is substituted with a hydroxy group. In particular, the chelating agent is more preferably DPTA or derivatives thereof. DPTA is preferable because four carboxy groups are included and a hydroxy group is bonded to the diamine structure so as to increase water solubility. In this regard, examples of substituents that enhance the water solubility of the chelating agent include, in addition to a hydroxy group, a sulfo group that increase the solubility in a neutral range and in an alkaline range. Further, the chelating agent is preferably an alkali metal salt. Examples of alkalis include lithium, sodium, and potassium, and lithium and sodium are particularly preferable. It is preferable that the content of the chelating agent be within the range of 1.5 molar equivalents or less relative to the titanium ions. It is preferable that equal moles of titanium ions and the chelating agent be included and that functions are sufficiently performed in this range.

[Chem. 1]

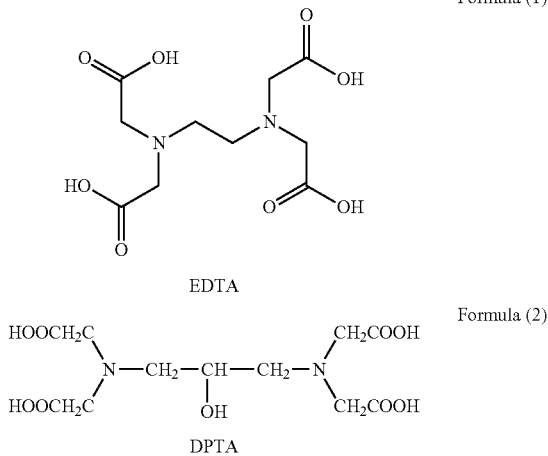

EDTA — Formula (1)

DPTA — Formula (2)

The catechol-based compound included in the negative electrode electrolyte solution may contain at least one of pyrocatechol and catechol derivatives having at least one of a hydroxy group, a sulfo group, and a carboxy group as a substituent. The catechol-based compound may contain at least one of pyrocatechol (formula 3), pyrogallol (formula 4), 4,5-dihydroxy-1,3-benzenedisulfonic acid (DHBDS, formula 5), and derivatives thereof. In particular, DHBDS is more preferable. This is because DHBDS has a sulfo group and, therefore, the solubility in the neutral range and the alkaline range is increased, as described with respect to the chelating agent. It is preferable that the content of the catechol-based compound be within the range of 1.5 molar equivalents or less relative to the titanium ions. It is preferable that equal moles of titanium ions and the catechol-based compound be included and that functions be sufficiently performed in this range.

[Chem. 2]

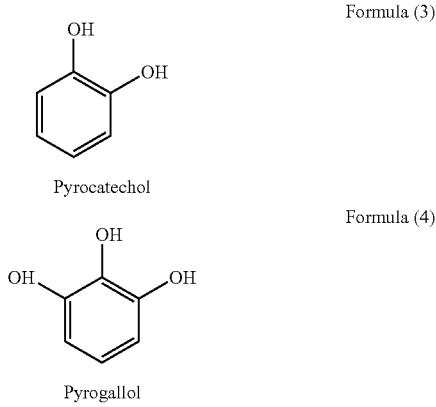

Pyrocatechol — Formula (3)

Pyrogallol — Formula (4)

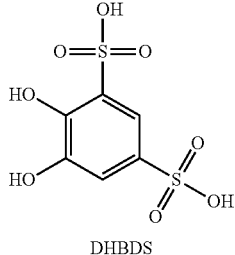

DHBDS — Formula (5)

The negative electrode electrolyte solution may be a negative electrode active material solution (anolyte) having a function of an active material that can perform charge and discharge. It is conjectured that the negative electrode electrolyte solution contains a titanium complex in which a chelating agent and a catechol-based compound coordinate with a titanium ion. The resulting complex can perform oxidation and reduction and, therefore, functions as a negative electrode active material. In addition, the negative electrode electrolyte solution may be a water-soluble oxidation-reduction substance and be a mediator. A mediator is a substance that mediates electron transfer between a solid active material and a collector. In a flow battery in which the mediator and the solid active material are combined, the mediator is circulated, and the solid active material can be used without being circulated. Therefore, the content of the solid active material in the flow battery can be increased and the capacity can be increased. The negative electrode solid active material may contain at least one of, for example, lithium titanate phosphate (LTP) and sodium titanate phosphate (NTP). The negative electrode electrolyte solution has a low-potential-side oxidation-reduction potential lower than the oxidation-reduction potential of the solid active material and a high-potential-side oxidation-reduction potential higher than the oxidation-reduction potential of the solid active material and, therefore, the combination of these potentials is favorable.

The pH of the negative electrode electrolyte solution may be 3 or more and 9 or less. The negative electrode electrolyte solution can be stably used in a wider pH range, e.g., a weak acidic range, a neutral range, and a weak alkaline range, because the chelating agent, the catechol-based compound, and the titanium ions are included and the titanium ions are stabilized. A material including a cation of sodium, lithium, potassium, an organic ammonium, or the like can be used for adjusting the pH of the negative electrode electrolyte solution. In the negative electrode electrolyte solution, the combining ratio of the titanium ions to the chelating agent to the catechol-based compound is preferably 1:(0.25 to 2):(0.25 to 2) on a molar equivalent basis, and the combining ratio is more preferably 1:(0.5 to 1.5):(0.5 to 1.5).

(Flow Battery)

The flow battery according to the present disclosure includes a liquid delivery portion that enables any one of the above-described negative electrode electrolyte solutions to flow and to come into contact with a negative electrode collector. The negative electrode electrolyte solution can be oxidized and reduced and, therefore, can be utilized as an anolyte. In the flow battery, the negative electrode electrolyte solution may be a mediator-containing electrolyte solution including, as a mediator, a complex that contains a titanium ion, the chelating agent, and the catechol-based compound, and a solid active material may also be present in a flow passage through which the negative electrode electrolyte solution is circulated. In this regard, it is preferable that the negative electrode electrolyte solution have a low-potential-side oxidation-reduction potential lower than the oxidation-reduction potential of the solid active material and have a high-potential-side oxidation-reduction potential higher than the oxidation-reduction potential of the solid active material. The flow battery may include a case, a separator that separates the inside of the case into a positive electrode chamber and a negative electrode chamber, a negative electrode collector disposed in the negative electrode chamber, and a storage portion that is disposed in a flow passage, through which the negative electrode electrolyte solution flows, and that stores the solid active material. In the flow battery, a positive electrode may have a configuration in which a positive electrode active material solution (catholyte) is circulated, a configuration in which a solid positive electrode active material and a circulating mediator-containing electrolyte solution are used in combination, or a configuration in which a positive electrode active material is provided and an electrolyte solution is not circulated. The following description is related to mainly a flow battery in which a positive electrode and a negative electrode use a solid active material and a mediator-containing electrolyte solution that contains a mediator.

(Positive Electrode)

There is no particular limitation regarding a solid active material used for the positive electrode as long as the solid active material is within the range of a voltage which can be charged and discharged in an aqueous electrolyte solution. For example, inorganic active materials, e.g., lithium iron phosphate ($LiFePO_4$), sodium vanadium phosphate ($Na_3V_2(PO_4)_2$), and lithium manganate ($LiMn_2O_4$), are suitable for use. In particular, lithium iron phosphate and sodium vanadium phosphate are more suitable. The solid active material is not limited to the inorganic active material and may be an organic active material that is insoluble or hardly soluble in water, for example, a quinone-based compound or an electrically conductive high-molecular-weight compound, e.g., a polyaniline. There is no particular limitation regarding the shape of the solid active material. A granular shape, a fibrous shape, a sheet-like shape, a porous shape, and the like can be adopted because a contact area with the mediator can be increased. For example, when a granular shape is adopted, the size may be 0.1 mm to 10 mm. A granular solid active material may be produced by, for example, kneading a solid active material and a binder into a massive lump and performing pulverization. Regarding the binder, for example, fluororesins, e.g., polytetrafluoroethylene (PTFE), polyvinylidene fluoride (PVDF), and fluororubber, and thermoplastic resins, e.g., polypropylene and polyethylene, ethylene-propylene-diene monomer (EPDM), sulfonated EPDM, natural butyl rubber (NBR), styrene butadiene rubber (SBR), polyacrylonitrile (PAN), and the like may be used alone, or at least two types may be used in combination. The ratio of the solid active material to the binder may be within the range of, for example, 99:1 to 90:10 on a mass ratio basis. Meanwhile, for example, a solid active material having a surface coated with carbon may be used. Dissolution of solid active material components into an electrolyte solution can be prevented by the carbon coating and, therefore, an effect of preventing degradation is expected. Regarding a carbon coating method, for example, the surface of the solid active material may be coated with a substance serving as a carbon source and, thereafter, firing may be performed in an inert atmosphere. The carbon source may be an organic compound or a sugar compound, e.g., sucrose. Examples of an inert atmosphere include an argon atmosphere and a nitrogen atmosphere.

There is no particular limitation regarding the positive electrode mediator, as long as the mediator is a water-soluble oxidation-reduction substance. For example, a polyoxometalate (POM) is preferable. Polyoxometalates have a large molecular weight and do not easily pass through a separator. Therefore, cross contamination due to diffusion to the counter electrode does not easily occur. The polyoxometalate herein may be an isopolyacid or a heteropolyacid, and a heteropolyacid is preferable. Examples of heteropolyacids include silicovanadomolybdic acid ($H_{4-x}[SiV_xMo_{12-x}O_{40}]$ ($0 \leq x \leq 4$)), phosphovanadomolybdic acid ($H_{3+x}[PV_xMo_{12-x}O_{40}]$ ($0 \leq x \leq 4$)), and silicotungstic acid ($H_4[SiW_{12}O_{40}]$). The polyoxometalates may be used alone, or at least two types may be used in combination. When the mediator is silicovanadomolybdic acid, the value of x in the above-described formula is preferably 1.5 or more and 3.5 or less. Such a mediator can function in a wide pH range of pH 3 to pH 10.5 with good reproducibility. The mediator preferably has an oxidation-reduction potential (standard potential) which is close to the oxidation-reduction potential of the solid active material or has a plurality of oxidation-reduction potentials which encompass the oxidation-reduction potential of the solid active material (has a low-potential-side oxidation-reduction potential lower than the oxidation-reduction potential of the solid active material and a high-potential-side oxidation-reduction potential higher than the oxidation-reduction potential of the solid active material). In such a mediator, polarization does not easily occur, and energy loss can be reduced. In particular, regarding a battery that includes an aqueous-solution-based electrolyte solution, the cell voltage is as low as about 1 V and, thereby, the effect of reducing polarization is relatively enhanced compared with a battery including a nonaqueous electrolyte solution. For example, if polarization occurs to a great extent, a situation in which even the drive energy of a liquid delivery portion (liquid delivery pump and the like) cannot be ensured may arise. In this regard, a single type of mediator can address an oxidation reaction and a reduction reaction of the solid active material and, therefore, it is not necessary to use a plurality of types of mediators. Here, the oxidation-reduction potential close to the oxidation-reduction potential of the solid active material may be an oxidation-reduction potential having a difference within the range of 0.5 V or less from the oxidation-reduction potential of the solid active material, preferably an oxidation-reduction potential having a difference within the range of 0.18 V or less, and more preferably an oxidation-reduction potential having a difference within the range of 0.12 V or less. Even when the mediator has a plurality of oxidation-reduction potentials which encompass the oxidation-reduction potential of the solid active material, it is more preferable that the mediator have oxidation-reduction potentials close to the oxidation-reduction potential of the solid active material. In this regard, the above-described polyoxometalate has a plurality of oxidation-reduction potentials, which encompass the oxidation-reduction potential of the solid active material, at positions close to the oxidation-reduction potential of the solid active material.

The mediator-containing electrolyte solution of the positive electrode may contain an electrically conductive material. Regarding the electrically conductive material, for example, graphite, e.g., natural graphite (flaky graphite, scaly graphite) and artificial graphite, acetylene black, carbon black, Ketjenblack, carbon whiskers, needle coke, carbon fibers, and metals (copper, nickel, aluminum, silver, gold, and the like) can be used alone or in combination of at least two thereof. In this regard, it is preferable that the electrolyte solution does not contain an electrically conductive material. When the positive electrode electrolyte solution contains the mediator, electron transfer between the solid active material and the collector is smoothly performed without using the electrically conductive material.

Regarding the collector of the positive electrode, carbon felt, carbon paper, aluminum, copper, titanium, stainless steel, nickel, iron, platinum, baked carbon, electrically conductive high-molecular-weight compounds, electrically conductive glass, and the like can be used and, in addition, materials in which the surface of aluminum, copper, or the like is processed with carbon, nickel, titanium, silver, platinum, gold, or the like for the purpose of enhancing adhesiveness, electrical conductivity, and oxidation (reduction) resistance can also be used. Examples of shapes of the collector include a foil shape, a film shape, a sheet shape, a net shape, a punched or expanded shape, a lath body, a porous body, a foamed body, and a body formed by a fiber group. The collector having a thickness of, for example, 1 cm to 500 μm is used. In this regard, the collector may be called an electrode in the flow battery.

In the liquid delivery portion of the positive electrode, the mediator-containing electrolyte solution that contains no solid active material may be circulated so as to be in contact with the collector, or an electrode composition including the solid active material and the mediator-containing electrolyte solution may be circulated so as to be in contact with the collector. The liquid delivery portion may be, for example, a liquid delivery pump. A predetermined amount of the positive electrode composition has to be circulated by using the liquid delivery pump, and the predetermined flow rate can be appropriately set in accordance with a battery scale. In addition, the liquid delivery portion may include a positive electrode chamber, the liquid delivery pump (circulation pump), and a circulation passage connected to a positive electrode storage portion and may circulate at least the positive electrode mediator-containing electrolyte solution in the positive electrode composition.

A separator can be used without a particular limitation as long as the separator has ion permeability and, in addition, has a function of preventing cross contamination, that is, mixing of the positive electrode composition and the negative electrode composition. For example, the separator may be at least one of an ion-conducting polymer membrane (ion-exchange membrane) that can conduct ions, an ion-conducting solid electrolyte membrane, a gel membrane, a microporous membrane, and the like. Examples of ion-conducting polymer membranes include a perfluorocarbon material, which is composed of a hydrophobic tetrafluoroethylene skeleton formed of carbon-fluorine, and a perfluoro side chain having a sulfonic group (tetrafluoroethylene-perfluorovinyl copolymer). More specifically, for example, Nafion (Nafion is a registered trademark) is included. In this regard, ion-conducting solid electrolyte membranes include, for example, cation-conducting glass (oxide-based glass).

(Negative Electrode)

Regarding the negative electrode, the negative electrode collector may be disposed in the negative electrode chamber, the solid active material may be stored in the storage portion, and the liquid delivery portion may deliver the above-described negative electrode electrolyte solution serving as a mediator-containing electrolyte solution between the negative electrode chamber and the storage portion. For example, LTP and NTP can be used for the solid active material. For example, the above-described positive electrode collector can be used for the negative electrode collector. Also, the liquid delivery portion of the negative electrode may have the same configuration as the liquid delivery portion of the positive electrode.

FIG. 1 is an explanatory diagram schematically showing the configuration of a flow battery 10 according to an embodiment of the present invention. The flow battery 10 includes a case 12, a separator 18 that separates the inside of the case 12 into a positive electrode chamber 14 and a negative electrode chamber 16, a positive electrode collector 20 disposed in the positive electrode chamber 14, and a negative electrode collector 50 disposed in the negative electrode chamber 16. In the flow battery 10, a positive-electrode-side circulation passage 32 is provided between the positive electrode chamber 14 and a positive electrode reservoir container 30, and a positive-electrode-side circulation pump 38 is provided in the midstream of the positive-electrode-side circulation passage 32. Also, a negative-electrode-side circulation passage 62 is provided between the negative electrode chamber 16 and a negative electrode reservoir container 60, and a negative-electrode-side circulation pump 68 is provided in the midstream of the negative-electrode-side circulation passage 62. A positive electrode composition 26 including a positive electrode mediator-containing electrolyte solution 22 and a positive electrode solid active material 24 is stored inside the positive electrode reservoir container 30, and an outflow of the positive electrode solid active material 24 is prevented by a filter 31. Also, a negative electrode composition 56 including a negative electrode mediator-containing electrolyte solution 52 and a negative electrode active material 54 is stored inside the negative electrode reservoir container 60, and an outflow of the negative electrode active material 54 is prevented by a filter 61. In addition, the flow battery 10 includes a circuit 80 so as to measure the current and the voltage thereof. The circuit 80 includes a voltmeter 83 so as to measure a potential difference (cathode voltage) between a reference electrode (for example, Ag/AgCl reference electrode) connected to an outlet 36 of the positive electrode chamber 14 and the positive electrode collector 20. Also, the circuit 80 includes a voltmeter 86 so as to measure a potential difference (anode voltage) between a reference electrode 84 (for example, Ag/AgCl reference electrode) connected to an outlet 66 of the negative electrode chamber 16 and the negative electrode collector 50. In addition, an ammeter 87 so as to measure a current that flows between the positive electrode collector 20 and the negative electrode collector 50 and a voltmeter 88 which is disposed parallel to an external input and output device 89 and which measures a potential difference between the positive electrode collector 20 and the negative electrode collector 50 (cell voltage) are included.

Regarding the flow battery 10, charge and discharge is performed while the positive electrode mediator-containing electrolyte solution 22 is circulated by the positive-electrode-side circulation pump 38 so as to be in contact with the positive electrode collector 20 and, in addition, the negative electrode mediator-containing electrolyte solution 52 is circulated by the negative-electrode-side circulation pump 68 so as to be in contact with the negative electrode collector 50. At this time, it is also possible to measure each of the voltages and the currents by the circuit 80 and to adjust, on the basis of the resulting values, each of the flow rates of the mediator-containing electrolyte solutions 22 and 52 and the like, which are circulated.

In the above-described negative electrode electrolyte solution and flow battery, the negative electrode electrolyte solution contains Ti ions, a chelating agent, and a catechol-based compound and is stabilized. Therefore, charge and discharge can be stably performed in a wider pH range. It is conjectured that such an effect is obtained because of the following. For example, it is conjectured that, in the negative electrode electrolyte solution, a complex in which both the chelating agent and the catechol-based compound coordinated with the titanium ion is formed, the ligands can have a plurality of states, and thereby, the complex functions as a negative electrode active material solution that can perform charge and discharge. Also, it is conjectured that the complex exhibits a plurality of oxidation-reduction potentials with the oxidation-reduction potential of a solid active material encompassed and favorably functions as a flow battery mediator which is present in combination with the solid active material. Consequently, the negative electrode electrolyte solution that can operate from the weak acidic range, the neutral range, and the weak alkaline range, as described above, can address a corrosion problem and a safety problem at the occurrence of leakage. In addition, when the negative electrode electrolyte solution serving as a mediator is present in combination with the solid active material and is used for the flow battery, the capacity can be increased and operation from the weak acidic range to the weak alkaline range can be performed, the operation being necessary to prevent deactivation of the solid active material. Further, a mediator that functions at multiple oxidation-reduction potentials, which are close to a solid active material oxidation-reduction potential required for performing charge and discharge of the solid active material or which encompass the solid active material oxidation-reduction potential, is provided, and a high-capacity flow battery exhibiting a small extent of polarization can be realized.

In addition, the above-described flow battery includes an aqueous electrolyte solution and, therefore, is safer than a flow battery including a nonaqueous electrolyte solution, and the cost can be more reduced. Further, when a liquid phase oxidation-reduction substance is used as a mediator, electron transfer between the collector and the mediator and between the mediator and the solid active material, that is, oxidation and reduction, can be performed even in a system in which electrical contact between solids is difficult. Further, when the negative electrode electrolyte solution (mediator-containing electrolyte solution) is a mediator which has a plurality of oxidation-reduction potentials so as to encompass the oxidation-reduction potential of the solid active material, polarization is made to be a small extent, and a large current can be taken. Then, in the above-described flow battery, only the mediator-containing electrolyte solution that includes no solid active material is made to flow and, therefore, the viscosity of the flowing material is low compared with the viscosity when the entire electrode composition including the solid active material is made to flow. Consequently, the liquid delivery pressure can be reduced compared with the delivery pressure when the entire electrode composition is made to flow, and the pump drive energy can be reduced so as to increase the efficiency.

Here, the correspondence between the constituents of the present embodiment and the constituents of the present disclosure will be clarified. The negative electrode reservoir container 60, the negative-electrode-side circulation passage 62, and the negative-electrode-side circulation pump 68 of the present embodiment correspond to the liquid delivery portion of the present disclosure, and the negative electrode reservoir container 60 corresponds to the storage portion.

In this regard, the present invention is not limited to the above-described embodiment and can be realized in various forms within the technical scope of the present invention, as a matter of course.

For example, in the above-described flow battery 10, the positive electrode reservoir container 30 includes the filter 31 but it is not always necessary that the filter 31 be included. In this case, the positive electrode composition 26 including not only the positive electrode mediator-containing electrolyte solution 22 but also the positive electrode solid active material 24 flows through the positive-electrode-side circulation passage 32. The positive electrode composition 26 flows in the state of, for example, a slurry in which the positive electrode solid active material 24 is suspended in the positive electrode mediator-containing electrolyte solution 22. Likewise, the negative electrode reservoir container 60 includes the filter 61 but it is not always necessary that the filter 61 be included.

Figure 2:
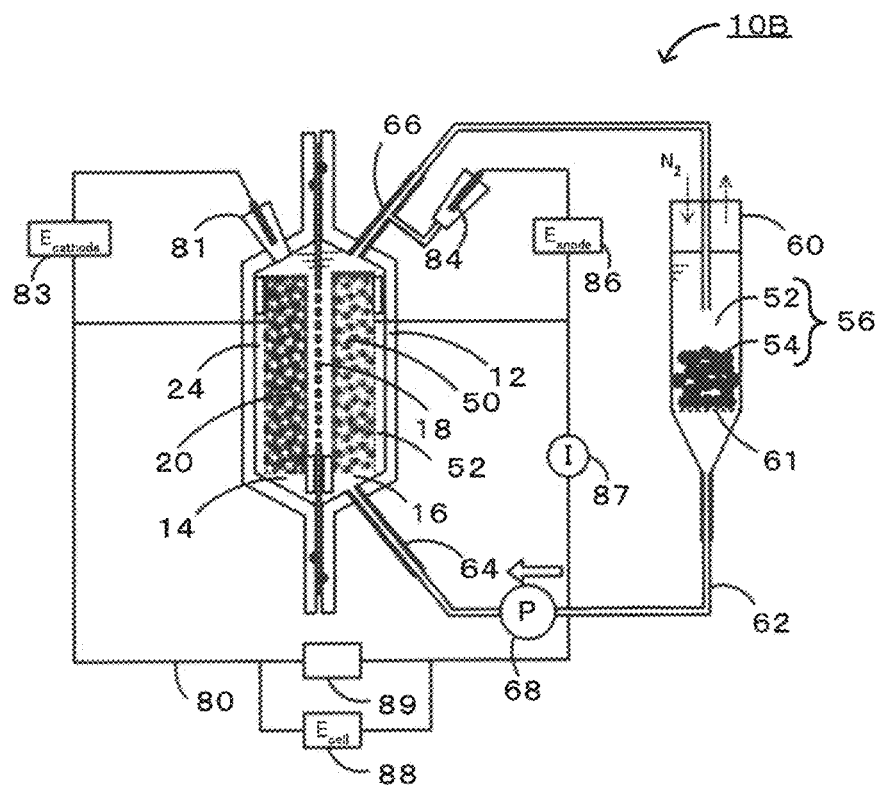
FIG. 2 is an explanatory diagram schematically showing the configuration of a flow battery 10B.

In the above-described flow battery 10, the electrolyte solutions are made to flow in both the positive electrode and the negative electrode, but the positive electrode is not specifically limited to this as long as the negative electrode electrolyte solution is made to flow. FIG. 2 is an explanatory diagram schematically showing the configuration of a flow battery 10B having the configuration of a flow battery as the negative electrode. In the flow battery 10B, the same configurations as the configurations of the flow battery 10 are indicated by the same reference numerals as those set forth above and explanations thereof will not be provided. In the flow battery 10B, particles of the positive electrode solid active material 24 and the positive electrode collector 20 are stored in the positive electrode chamber 14. In this regard, the circulation passage is not connected to the positive electrode chamber 14. Even such a structure is adopted, the capacity can be increased by using the configuration of the flow battery in the negative electrode.

EXAMPLES

Examples in which the negative electrode electrolyte solution and the flow battery were specifically produced will be described below as experimental examples. In this regard, the present disclosure is not limited to the following experimental examples.

Example 1

A 1 M titanium sulfate aqueous solution was mixed with 1 molar equivalent of 1 M 1,3-diamino-2-hydroxypropane-N,N,N',N'-tetraacetic acid (DPTA (DPTALi)) aqueous solution neutralized with lithium hydroxide. Thereafter, 1 molar equivalent of 1M 4,5-dihydroxy-1,3-benzenedisulfonic acid (DHBDS (DHBDSLi)) aqueous solution neutralized with lithium hydroxide was added so as to produce dark brown TiDDLi (1:1:1) of experimental example 1, which served as the negative electrode electrolyte solution (mediator-containing electrolyte solution). Even when this electrolyte solution was gradually neutralized with lithium hydroxide and the pH was adjusted to pH=8 that was weakly alkaline, precipitation did not occur.

(Cyclic Voltammetry (CV) Evaluation)

Figure 3:
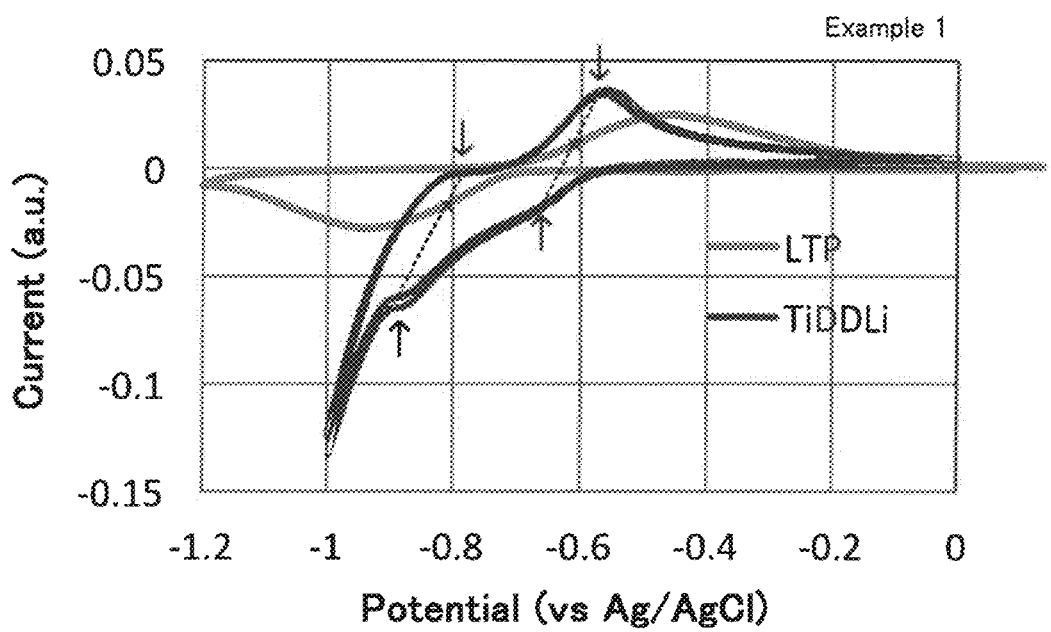
FIG. 3 shows CV measurement results of a mediator-containing electrolyte solution and a solid active material of experimental example 1.

The pH of the electrolyte solution of experimental example 1 was adjusted to 7.09, and a cyclic voltammetry (CV) evaluation was performed. The CV evaluation was performed under the condition of the sweep rate of 20 mV/sec in a nitrogen atmosphere where a working electrode was a platinum electrode, a counter electrode was a platinum electrode, and a reference electrode was a silver-silver chloride electrode. Also, a CV evaluation of lithium titanate phosphate (LiTi$_2$(PO$_4$)$_3$, LTP) serving as a negative electrode active material was performed. Regarding the CV evaluation of LTP, 80 parts by mass of LTP, 10 parts by mass of Ketjenblack serving as an electrically conductive material, and 10 parts by mass of polytetrafluoroethylene (PTFE) serving as a binder were weighed and kneaded, 5 mg of the resulting material was taken and evaluated by using an electrode interposed between stainless steel meshes. The other conditions were set to be the same as the conditions for the CV evaluation in experimental example 1. FIG. 3 shows CV measurement results of the electrolyte solution and the solid active material (LTP) of experimental example 1. Regarding the electrolyte solution, precipitation did not occur in the neutral range and a plurality of oxidation-reduction potentials which encompassed the oxidation-reduction potential of LTP were observed (refer to arrows in FIG. 3). Consequently, it was found that use for a negative electrode active material solution (anolyte) and use for a mediator when a solid active material was also present were possible.

(Production of Flow Battery)

Figure 4:
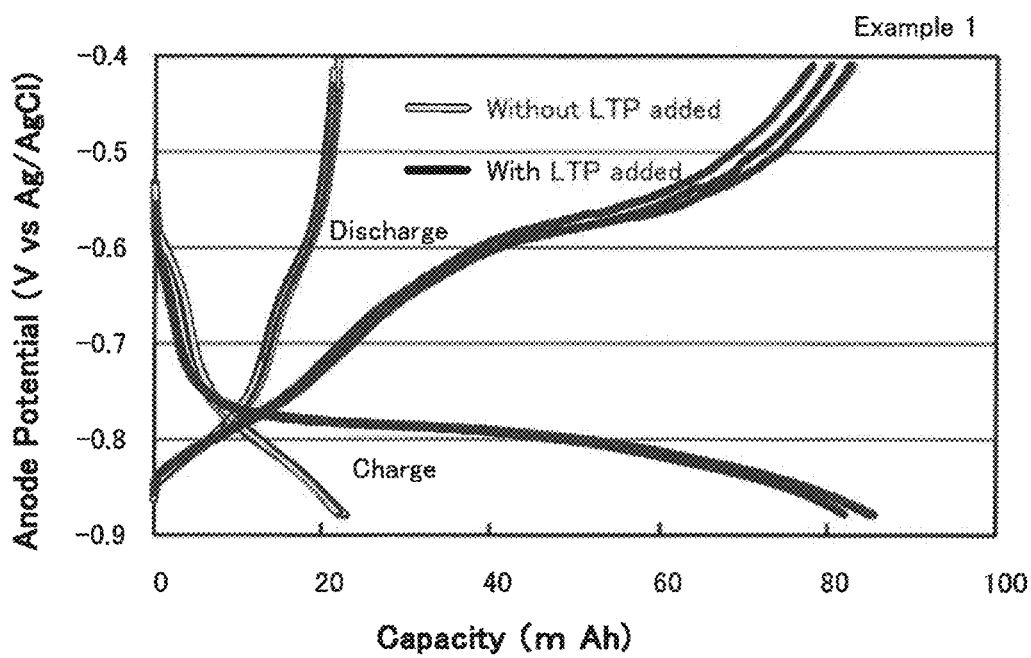
FIG. 4 shows charge and discharge curves of flow batteries of experimental example 1.
Figure 5:
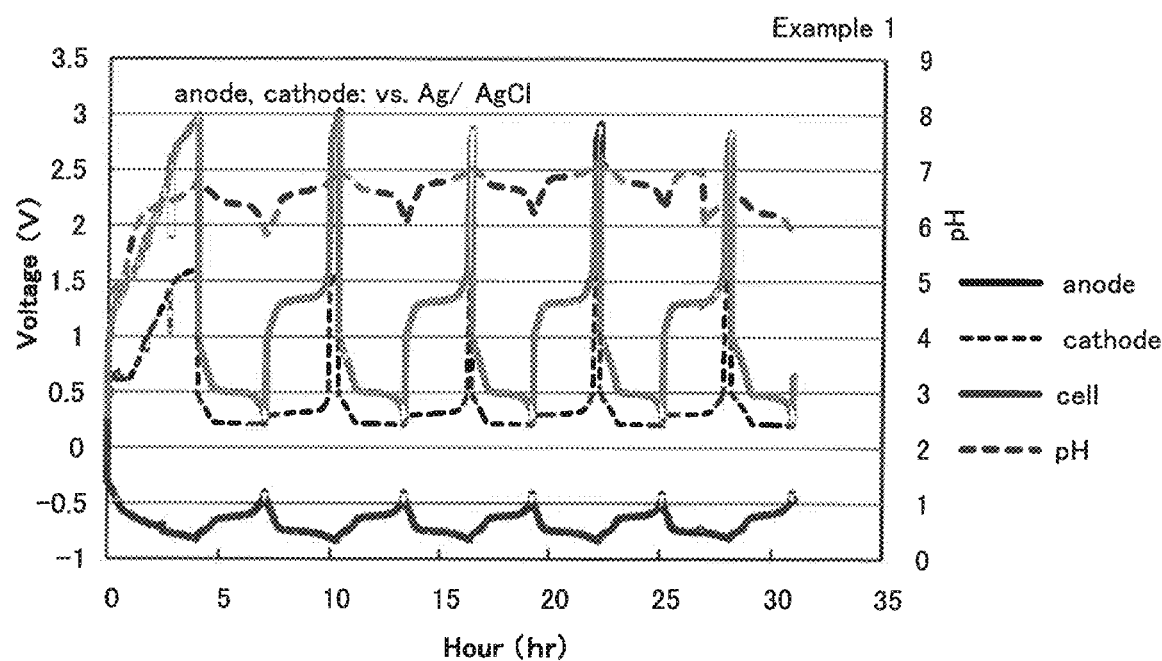
FIG. 5 shows evaluation results of flow battery characteristics when LTP was added in experimental example 1.

An anolyte for evaluating a flow battery was prepared as described below. Addition of 12.5 mL (1 molar equivalent) of 1M DPTA (DPTALi) neutralized with lithium hydroxide to 10 g of 30-percent-by-mass titanium sulfate aqueous solution and dissolution were performed. Thereafter, 3.75 g (1 molar equivalent) of DHBDS (DHBDSLi) neutralized with lithium hydroxide was added so as to produce dark brown TiDDLi (1:1:1). After neutralization with lithium hydroxide was performed, 1.25M lithium sulfate aqueous solution was added so as to dilute to 50 mL and produce a brown liquid of TiDDLi (1:1:1) having a pH of 4.12 and a concentration of 0.25 M. A solution produced by adding 1 mL of 2 M HEPES (4-(2-hydroxyethyl)-1-piperazineethane-sulfonic acid), which was adjusted to have a pH of 5.57 and which served as a buffer, to 15 mL of the above-described TiDDLi solution and by adjusting the pH to 4.80 was used as a negative electrode active material solution (anolyte) for a flow battery. Regarding a positive electrode solution (catholyte), a 1.25M lithium sulfate solution of silicovanadomolybdic acid (10 percent by mass) having a pH of 5.40 and serving as a polyoxometalate (POM) was used. Lithium iron phosphate (LFP) was used as a positive electrode solid active material. A Nafion (registered trademark) membrane was used as an ion exchange membrane (barrier membrane). The flow battery shown in FIG. 1 was assembled as described below. Initially, an ion exchange membrane and a positive electrode collector and a negative electrode collector, which were opposed to each other with the ion exchange membrane interposed therebetween, were disposed in the case. Regarding each of the positive electrode collector and the negative electrode collector, 4 cm$^2$ carbon felt having a thickness of 3 mm was used. Subsequently, 1.5 g of LFP and 15 mL of catholyte were put into a positive electrode reservoir container, and 1 g of granular LTP solid active material (85 percent by mass of LTP, 10 percent by mass of Ketjenblack, and 5 percent by mass of PTFE binder) and 15 mL of anolyte of experimental example 1 were put into a negative electrode reservoir container. In this regard, each of the reservoir containers was provided with a filter, in advance, which prevents flow out of solid active material particles, such that the solid active material particles did not flow inside the flow battery. In this manner, the flow battery capable of performing charge and discharge while the anolyte and the catholyte were made to flow was formed (refer to FIG. 1). At an initial stage of charge and discharge, an evaluation was performed while the anolyte liquid was circulated through LTP stored in the reservoir disposed in the flow passage of the anolyte. After a predetermined cycle evaluation, LTP was taken out of the reservoir, and an evaluation was performed by a method in which only the anolyte solution was circulated. FIG. 4 shows an anolyte charge and discharge curve (with LTP added) obtained while LTP was added and the anolyte was circulated through LTP and an anolyte charge and discharge curve (without LTP added) obtained while LTP was taken out and only the anolyte was circulated. Meanwhile, FIG. 5 shows evaluation results of flow battery characteristics when LTP was added. As shown in FIG. 4, when LTP was not added, two stages of plateaus corresponding to the CV waveform shown in FIG. 3 appeared at about −0.6 V and −0.8 V (with reference to Ag/AgCl) and, thereby, it was found that the function as an anolyte was performed. In addition, the capacity was increased to a great extent by adding LTP to the anolyte of experimental example 1 and, therefore, it was found that the function as a mediator-containing electrolyte solution for a flow battery, in which a solid active material was also present in the flow passage of a negative electrode active material solution, was favorably performed. As is clear from the charge-discharge curves and pH changes of the anolyte during repeated charge and discharge shown in FIG. 5, the function as a flow battery was performed in spite of pH fluctuation.

Experimental Examples 2 and 3

Figure 6:
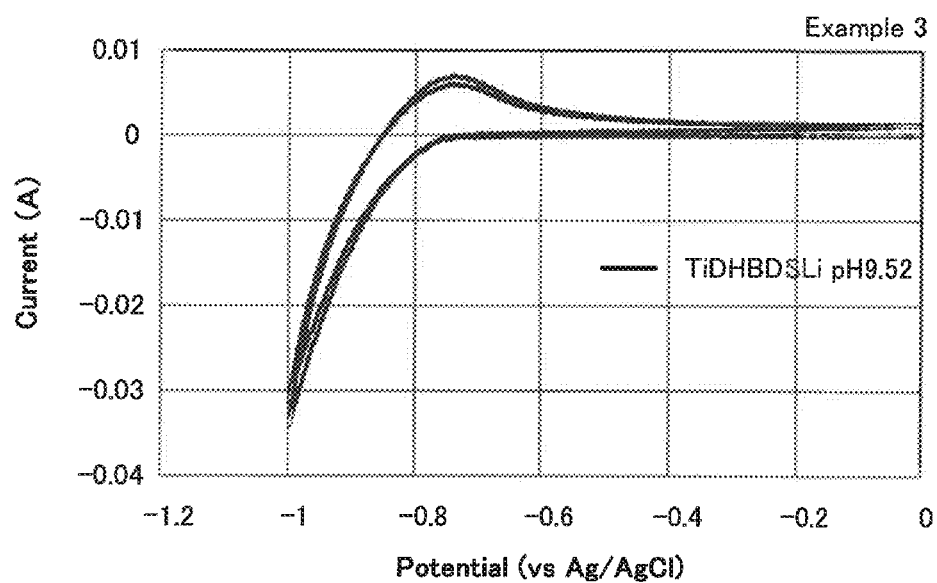
FIG. 6 shows CV measurement results of an electrolyte solution of experimental example 3.

A TiDPTA solution was produced by mixing the same equivalent of titanium sulfate and DPTAOH serving as a chelating agent without using DHBDS which belonged to a catechol group and was taken as an electrolyte solution of experimental example 2. Meanwhile, without using the chelating agent, a solution (TiDHBDSLi) in which titanium sulfate was mixed with a threefold equivalent of DHBDS neutralized with Li was produced and was taken as an electrolyte solution of experimental example 3. When the pH of the TiDPTA solution was adjusted, the solution became whitish at pH=0.4 or more, and when neutralization further proceeded, precipitation and solidification occurred. As described above, precipitation occurred to a great extent and, therefore, it was found that the TiDPTA solution could not be used for a flow battery anolyte of experimental example 2. Regarding the TiDHBDSLi solution of experimental example 3, precipitation did not occur and a brown liquid resulted. The CV evaluation of TiDHBDSLi of experimental example 3 was performed. FIG. 6 shows CV measurement results of the electrolyte solution of experimental example 3. Regarding the TiDHBDSLi solution of experimental example 3, precipitation did not occur until the alkaline range was reached. However, a clear reduction peak at about −0.9 V, which was observed in experimental example 1, was not observed and only a sharp increase in the current occurred in accordance with hydrogen generation. Consequently, it was found that the electrolyte solution of experimental example 3 could not perform reduction (charge) without hydrogen generation. Further, it was found that the electrolyte solution of experimental example 3 was unsuitable for presence in combination with the solid active material so as to increase the capacity because the oxidation-reduction potential was present apart from the oxidation-reduction potential of the solid active material and only in the reduction side.

Experimental Example 4

Figure 7:
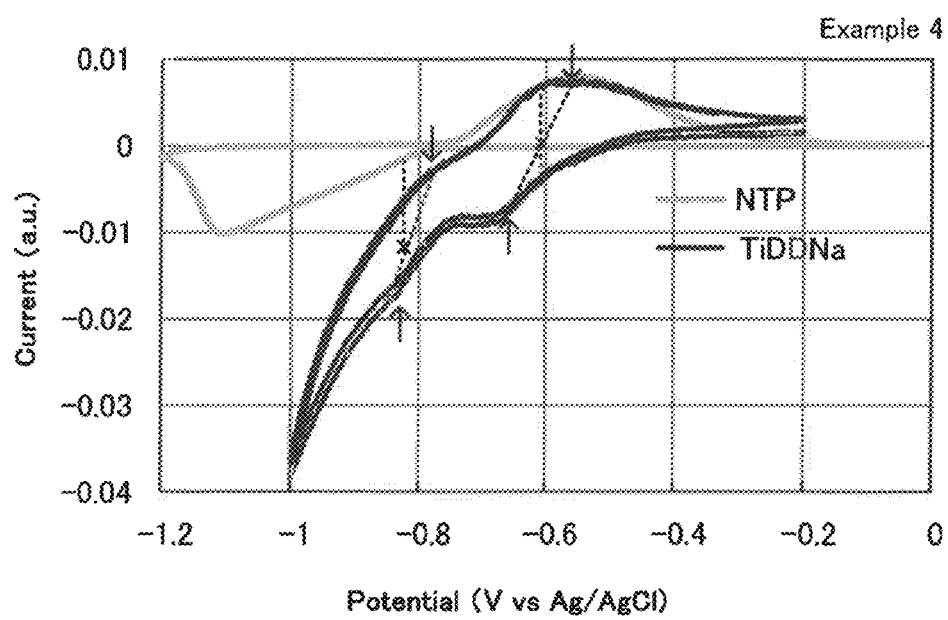
FIG. 7 shows CV measurement results of a mediator-containing electrolyte solution and a solid active material of experimental example 4.

A mediator-containing electrolyte solution was produced by using a Na salt instead of the Li salt in experimental example 1 and was taken as an electrolyte solution of experimental example 4 (TiDDNa). Regarding the electrolyte solution of experimental example 4, precipitation did not occur even when gradual neutralization was performed to weak alkalinity of pH=8 by sodium hydroxide. The pH of the electrolyte solution of experimental example 4 was adjusted to 7.03, and a CV evaluation was performed. FIG. 7 shows CV measurement results of the mediator-containing electrolyte solution and the solid active material (sodium titanate phosphate: NTP) of experimental example 4. As a result, it was found that even when the Li salt was changed to the Na salt, precipitation did not occur and good oxidation-reduction potential was exhibited over the weak acidic range to the weak alkaline range. In addition, in experimental example 4, a plurality of oxidation-reduction potentials which encompassed the oxidation-reduction potential of NTP were observed (refer to arrows in FIG. 7). Consequently, it was found that the electrolyte solution of experimental example 4 could be used for a negative electrode solution (anolyte) and a mediator-containing electrolyte solution when a solid active material was also present.

(Production of Flow Battery)

Figure 8:
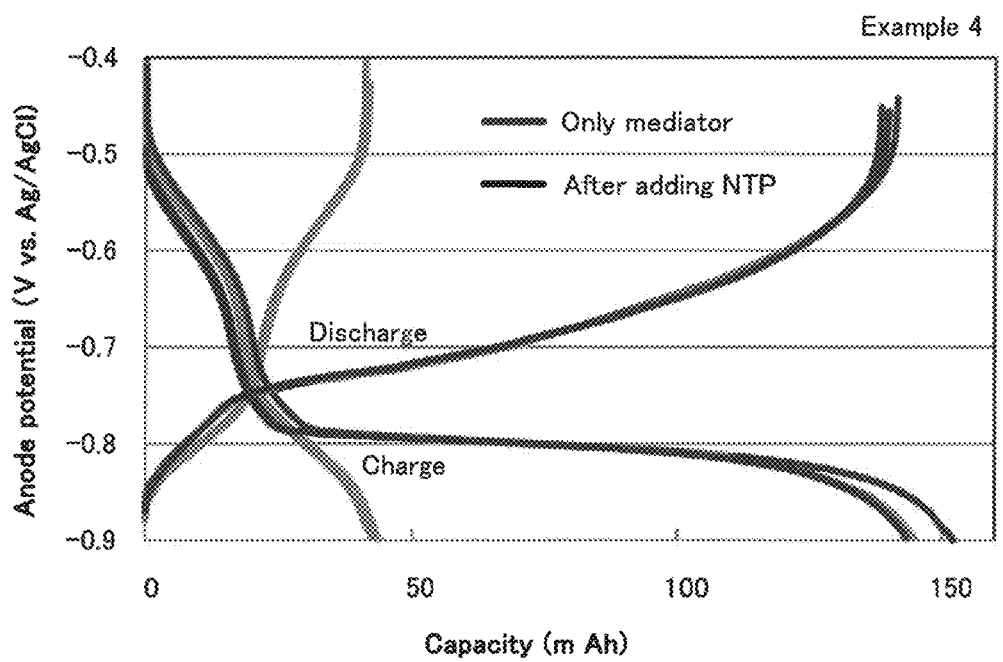
FIG. 8 shows charge and discharge curves of flow batteries of experimental example 4.
Figure 9:
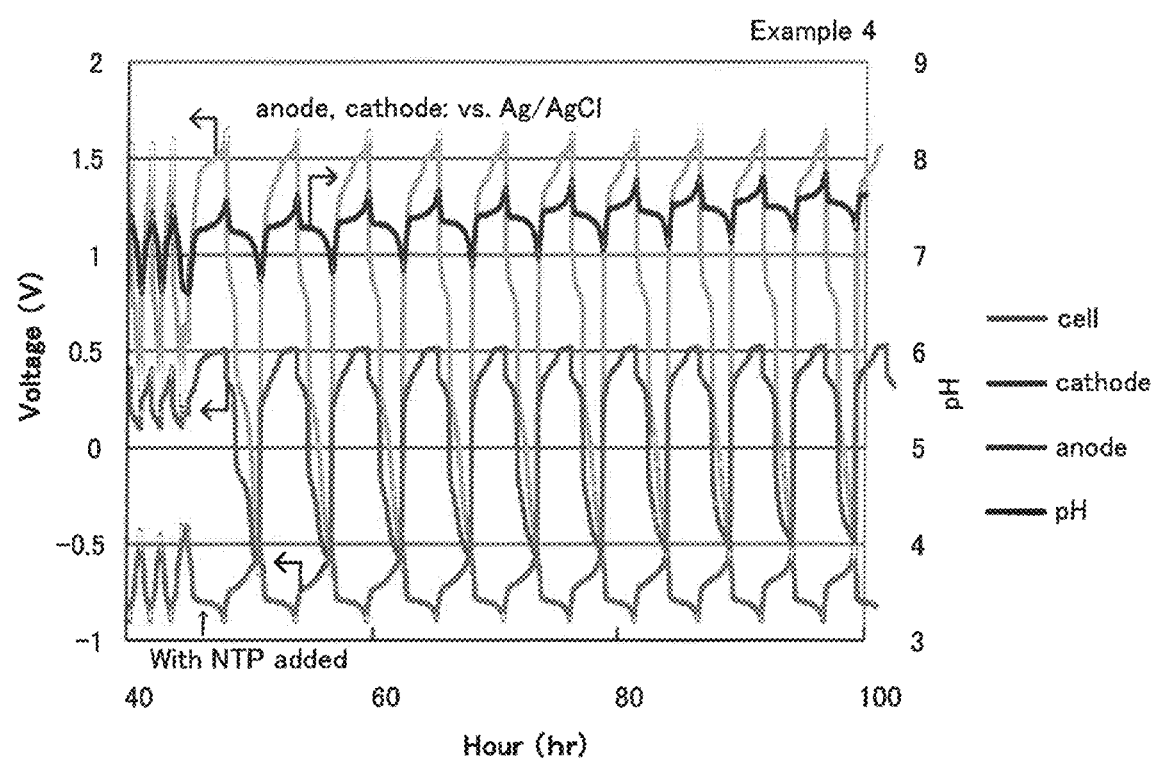
FIG. 9 shows evaluation results of flow battery characteristics before and after NTP was added in experimental example 4.

Meanwhile, a flow battery including the mediator-containing electrolyte solution of experimental example 4 was evaluated by the same operation as in experimental example 1. In the flow battery, an NTP solid active material was used instead of LTP, and a 1.5 M sodium sulfate aqueous solution of 0.5 M DHBDSNa was used as a catholyte without using the positive electrode solid active material. At the initial stage of charge and discharge, the solid active material was not put into the reservoir disposed in the flow passage of the anolyte, and only the anolyte solution was circulated. Thereafter, 1 g of granular NTP solid active material was added into the reservoir, the anolyte solution was circulated through the solid active material, and an evaluation was performed. Other operations were the same as in experimental example 1. FIG. 8 shows charge and discharge curves of the flow batteries of experimental example 4. FIG. 9 shows evaluation results of flow battery characteristics before and after NTP was added in experimental example 4. As shown in FIGS. 8 and 9, regarding the flow batteries of experimental example 4, plateaus in accordance with the CV waveforms were observed and, therefore, it was found that a function of the anolyte was performed. Also, it was found that the anolyte of experimental example 4 favorably functioned as a mediator for the flow battery in which the solid active material was also present in the flow passage of the negative electrode active material solution because the charge and discharge characteristics indicated a large capacity due to addition of NTP.

Experimental Examples 5 to 8

Figure 10:
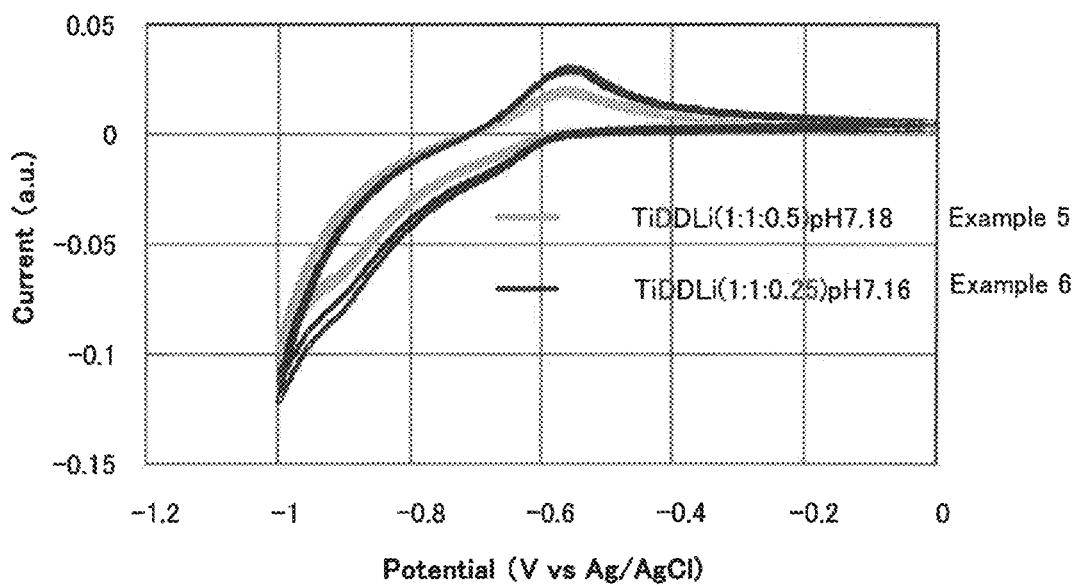
FIG. 10 shows CV measurement results of mediator-containing electrolyte solutions of experimental examples 5 and 6.
Figure 11:
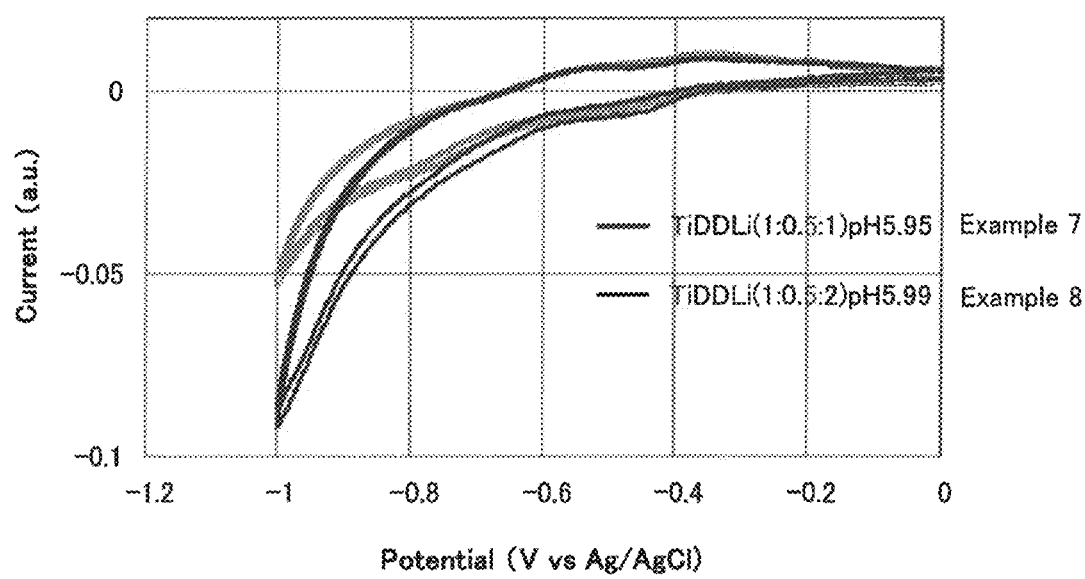
FIG. 11 shows CV measurement results of mediator-containing electrolyte solutions of experimental examples 7 and 8.

Solutions having equivalent ratios of Ti/DPTA/DHBDS of 1:1:0.5, 1:1:0.25, 1:0.5:1, and 1:0.5:2 were prepared and were taken as mediator-containing electrolyte solutions of experimental examples 5 to 8, respectively. The electrolyte solution of each of experimental examples 5 to 8 was subjected to pH adjustment with lithium hydroxide and, thereafter, was subjected to a CV evaluation. FIG. 10 shows CV measurement results of mediator-containing electrolyte solutions of experimental examples 5 and 6. FIG. 11 shows CV measurement results of mediator-containing electrolyte solutions of experimental examples 7 and 8. Even when the equivalent ratio of DHBDS was reduced to 0.25, precipitation did not occur in the neutral range, a plurality of oxidation-reduction potentials were observed, and therefore, it was found that use as the anolyte was possible. In addition, even when the equivalent ratio of DPTA was made smaller than Ti and was set to be 0.5, precipitation did not occur in the neutral range, a plurality of oxidation-reduction potentials were observed, and therefore, it was found that use as the anolyte was possible. Further, it was found that use as a mediator when a solid active material was also present was possible. For example, it was found that DHBDS favorably functioned even when the equivalent ratio was made to be one to two times the equivalent ratio of Ti.

Experimental Examples 9 and 10

Figure 12:
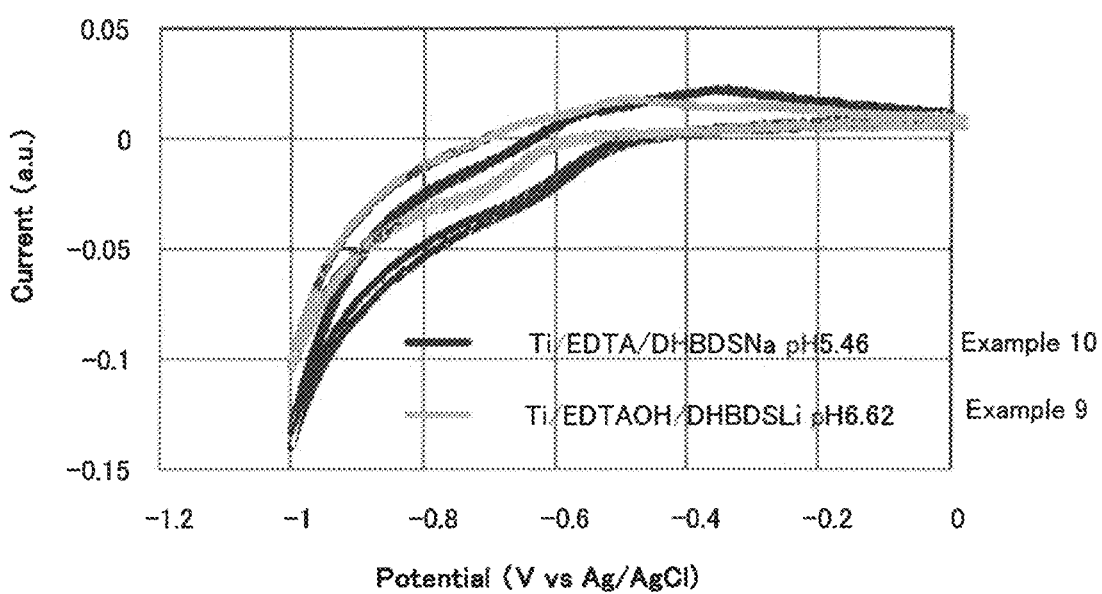
FIG. 12 shows CV measurement results of mediator-containing electrolyte solutions of experimental examples 9 and 10.

In experimental example 9, a mediator-containing electrolyte solution was produced by the same operations as in experimental example 1 except that EDTAOH was used instead of DPTA and the equivalent ratio was 1:1:1. In addition, in experimental example 10, a mediator-containing electrolyte solution was produced by the same operations as in experimental example 1 except that EDTA was used instead of DPTA, sodium was used instead of Li, and the equivalent ratio was 1:1:1. Regarding each of experimental examples 9 and 10, precipitation did not occur during neutralization. FIG. 12 shows CV measurement results of mediator-containing electrolyte solutions of experimental examples 9 and 10. As shown in FIG. 12, in each of the experimental examples, a plurality of oxidation-reduction potentials were observed in the neutral range and, therefore, it was found that the chelating agent having three or more carboxy groups in the molecule could be used as a constituent substance of the mediator of the flow battery.

Experimental Examples 11 and 12

In experimental example 11, an electrolyte solution was produced in which catechol or the like was not used, the same equivalent of Ti sulfate and EDTAOH were mixed, and a lithium salt was used. In addition, in experimental example 12, an electrolyte solution was produced in which catechol or the like was not used, the same equivalent of Ti sulfate and EDTAOH were mixed, and a sodium salt was used. The electrolyte solutions of experimental examples 11 and 12 were neutralized with lithium hydroxide and sodium hydroxide, respectively. As a result, it was found that the electrolyte solutions became whitish at pH=0.4 or more and could not be used for the anolyte.

Experimental Examples 13 and 14

Figure 13:
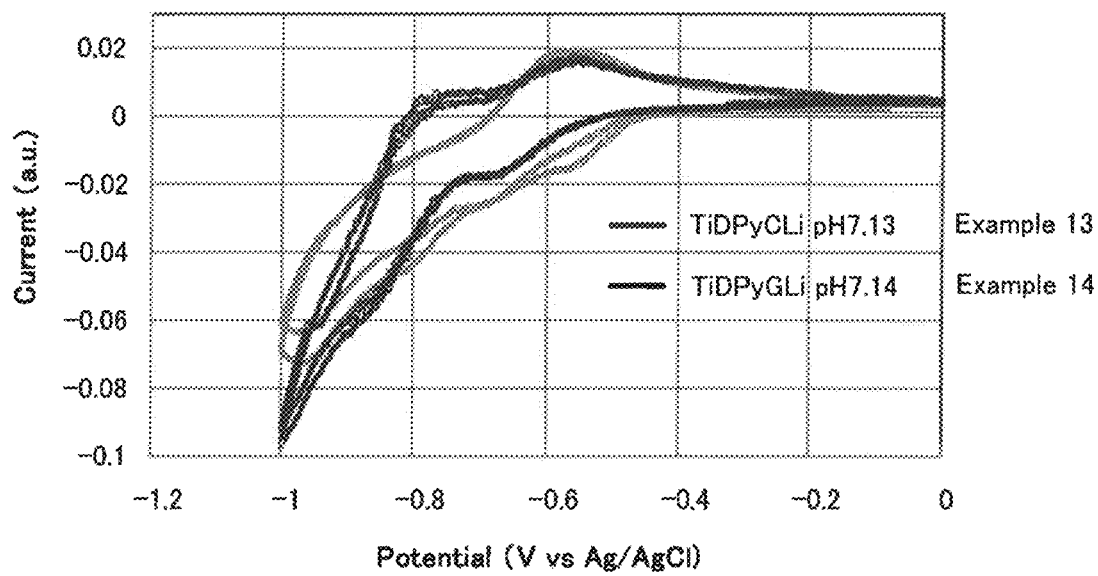
FIG. 13 shows CV measurement results of mediator-containing electrolyte solutions of experimental examples 13 and 14.

In experimental example 13, a mediator-containing electrolyte solution was produced in the same manner as experimental example 1 except that pyrocatechol (PyC) was used instead of DHBDS. In addition, in experimental example 14, a mediator-containing electrolyte solution was produced in the same manner as experimental example 1 except that pyrogallol (PyG) was used instead of DHBDS. Regarding each of electrolyte solutions, precipitation did not occur even when neutralization to the pH=9 was performed. FIG. 13 shows CV measurement results of the mediator-containing electrolyte solutions of experimental examples 13 and 14. As shown in FIG. 13, in each of the experimental examples, a plurality of oxidation-reduction potentials were observed and, therefore, it was found that the electrolyte solutions could be used for an anolyte and be used for a mediator when a solid active material was also present.

Experimental Examples 15 and 16

Figure 14:
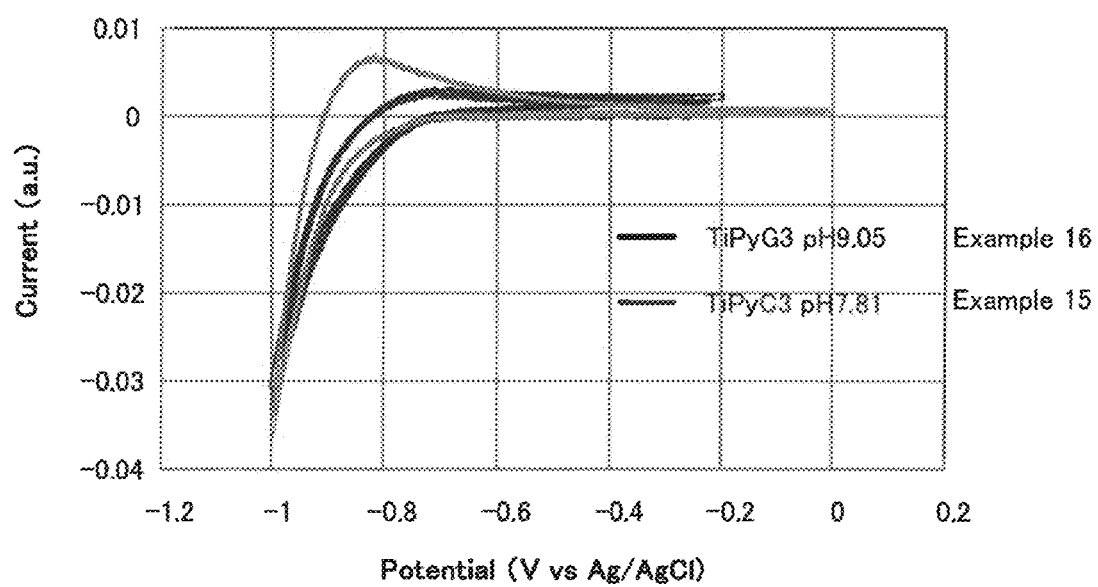
FIG. 14 shows CV measurement results of electrolyte solutions of experimental examples 15 and 16.

In experimental example 15, an electrolyte solution (TiPyC3) was produced, in which a chelating agent was not used, PyC was used for catechol or the like, a solution of Ti and threefold equivalent of catechol was prepared, and neutralization to the alkaline range was performed with lithium hydroxide. In addition, in experimental example 16, an electrolyte solution (TiPyG3) was produced, in which a chelating agent was not used, PyG was used for catechol or the like, a solution of Ti and threefold equivalent of catechol was prepared, and neutralization to the alkaline range was performed with lithium hydroxide. FIG. 14 shows CV measurement results of the electrolyte solutions of experimental examples 15 and 16. Regarding the electrolyte solutions of experimental examples 15 and 16, precipitation due to neutralization did not occur. However, as in experimental example 3, a clear reduction peak at about −0.9 V was not observed, and only a sharp increase in the current occurred. Consequently, it was found that the electrolyte solutions could not perform reduction (charge) without hydrogen generation. It was found that each of the electrolyte solutions was unsuitable for use as a mediator because the oxidation-reduction potential was present apart from the oxidation-reduction potential of the solid active material and only in the reduction side.

According to the above-described experimental results, in the electrolyte solution composed of only Ti and the chelating agent, precipitation occurred to a great extent in accordance with neutralization, and even when a supernatant was taken, further precipitation occurred due to an increase in pH of the supernatant. If precipitation occurs with an increase in the pH, as described above, the active material concentration is significantly decreased and, in addition, plugging of a flow passage in the flow battery results. Therefore, such a substance was unsuitable for use in the electrolyte solution of the flow battery. Meanwhile, it was found that, regarding the complex composed of only Ti and catechol or the like, precipitation did not occur, but charge could not be performed without hydrogen generation because a clear reduction peak was not observed. Further, it was found that, when an increase in the capacity by additional presence of a solid active material was intended, each of the electrolyte solutions was unsuitable for a mediator because the oxidation-reduction potential was present apart from the oxidation-reduction potential of the solid active material and only in the reduction side.

Meanwhile, from the CV evaluation and the charge and discharge evaluation of the flow battery of a mixed ligand complex composed of Ti, the chelating agent, and catechol or the like, it was found that oxidation and reduction occurred even in the neutral range, charge and discharge could be performed and, therefore, the mixed ligands complex could be effectively used as a flow battery anolyte which acted under the condition over weak acidity (pH=3 or more) to weak alkalinity (pH=9 or less). Further, when LTP or NTP serving as a solid active material was added into an anolyte flow passage, the capacity was increased to a great extent and, therefore, it was found that these electrolyte solutions also acted as a mediator. Incidentally, regarding the mixed ligands structure composed of Ti, an o-dihydroxybenzene structure, and carboxylic acid described in PTLs 1 and 2, the above-described phenomena do not occur, and the present phenomenon in which a plurality of oxidation-reduction potentials were exhibited with stability where precipitation did not occur up to the weak alkaline range while excessive base was not reached was found for the first time on the basis of the configuration according to the present disclosure, and it can be said that the phenomenon is an effect of use of a stable chelating agent rather than common carboxylic acid.

In this regard, the present disclosure is not limited to the above-described examples and can be realized in various forms within the technical scope of the present disclosure, as a matter of course.

The present application claims priority from Japanese Patent Application No. 2017-045723, filed on Mar. 10, 2017, the entire contents of which are incorporated herein by reference.

What is claimed is:

1. A negative electrode electrolyte solution that is used for a negative electrode of a flow battery in which an electrolyte solution is circulated so as to perform charge and discharge, comprising:
   titanium ions,
   a chelating agent comprising at least one of ethylenediaminetetraacetic acid (EDTA), 1,3-diamino-2-hydroxypropanetetraacetic acid (DPTA), and derivatives thereof, and
   a catechol-based compound having a catechol structure, the catechol-based compound comprising at least one of pyrocatechol, pyrogallol, 4,5-dihydroxy-1,3- benzenedisulfonic acid, and derivatives thereof.

2. The negative electrode electrolyte solution according to claim 1, wherein the content of the chelating agent is within the range of 1.5 molar equivalents or less relative to the titanium ions.

3. The negative electrode electrolyte solution according to claim 1, wherein the content of the catechol-based compound is within the range of 1.5 molar equivalents or less relative to the titanium ions.

4. The negative electrode electrolyte solution according to claim 1, wherein is 1,3-diamino-2-hydroxypropanetetraacetic acid (DPTA), or a derivative thereof.

5. The negative electrode electrolyte solution according to claim 1, wherein the pH of the negative electrode electrolyte solution is 3 or more and 9 or less.

6. The negative electrode electrolyte solution according to claim 1, wherein
   the catechol-based compound is an alkali metal salt, and
   the chelating agent is an alkali metal salt.

7. A flow battery comprising a liquid delivery portion that enables the negative electrode electrolyte solution according to claim 1 to flow and to come into contact with a negative electrode collector.

8. The flow battery according to claim 7, wherein
   a solid active material is also present in a flow passage through which the negative electrode electrolyte solution is circulated, and
   the negative electrode electrolyte solution is a mediator-containing electrolyte solution that includes a complex serving as the mediator and containing the titanium ions, the chelating agent, and the catechol-based compound.

9. The flow battery according to claim 7, further comprising:
   a case;
   a separator that separates the inside of the case into a positive electrode chamber and a negative electrode chamber;

a negative electrode collector disposed in the negative electrode chamber; and a storage portion that is disposed in a flow passage, through which the negative electrode electrolyte solution flows, and that stores the solid active material.

10. A flow battery comprising a liquid delivery portion that enables a negative electrode electrolyte solution to flow and to come into contact with a negative electrode collector, the negative electrode electrolyte solution comprising:

titanium ions, a chelating agent, and a catechol-based compound having a catechol structure, wherein:

a solid active material is also present in a flow passage through which the negative electrode electrolyte solution is circulated, the negative electrode electrolyte solution is a mediator-containing electrolyte solution that includes a complex serving as the mediator and containing the titanium ions, the chelating agent, and the catechol-based compound, and the negative electrode electrolyte solution has a low-potential-side oxidation-reduction potential lower than the oxidation-reduction potential of the solid active material and has a high-potential-side oxidation-reduction potential higher than the oxidation-reduction potential of the solid active material.

11. A flow battery comprising a liquid delivery portion that enables a negative electrode electrolyte solution to flow and to come into contact with a negative electrode collector, the negative electrode electrolyte solution comprising:

titanium ions, a chelating agent, and a catechol-based compound having a catechol structure, wherein:

a solid active material comprising at least one of lithium titanate phosphate and sodium titanate phosphate is also present in a flow passage through which the negative electrode electrolyte solution is circulated, and the negative electrode electrolyte solution is a mediator-containing electrolyte solution that includes a complex serving as the mediator and containing the titanium ions, the chelating agent, and the catechol-based compound.

\* \* \* \* \*